United States Patent
Kezobo et al.

(10) Patent No.: US 7,828,112 B2
(45) Date of Patent: Nov. 9, 2010

(54) ELECTRIC POWER STEERING DEVICE

(75) Inventors: Isao Kezobo, Tokyo (JP); Noriyuki Inoue, Tokyo (JP); Chiaki Fujimoto, Tokyo (JP); Takayuki Kifuku, Tokyo (JP); Masahiro Kimata, Tokyo (JP); Kazumichi Tsutsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 40 days.

(21) Appl. No.: 12/293,140

(22) PCT Filed: Mar. 8, 2007

(86) PCT No.: PCT/JP2007/054516

§ 371 (c)(1),
(2), (4) Date: Sep. 16, 2008

(87) PCT Pub. No.: WO2007/138772

PCT Pub. Date: Dec. 6, 2007

(65) Prior Publication Data

US 2009/0084616 A1  Apr. 2, 2009

(30) Foreign Application Priority Data

May 26, 2006  (JP)  ............................. 2006-146390

(51) Int. Cl.
*B62D 5/04* (2006.01)
(52) U.S. Cl. ...................................... 180/446; 180/443
(58) Field of Classification Search ................ 180/443, 180/446
See application file for complete search history.

(56) References Cited

U.S. PATENT DOCUMENTS

| | | | | |
|---|---|---|---|---|
| 2006/0070794 A1* | 4/2006 | Fujita et al. | ................. | 180/446 |
| 2006/0090952 A1* | 5/2006 | Ito | ............................. | 180/446 |
| 2007/0199764 A1* | 8/2007 | Kifuku et al. | ............... | 180/446 |
| 2008/0066994 A1* | 3/2008 | Fujita et al. | ................. | 180/446 |
| 2008/0196966 A1* | 8/2008 | Maruyama et al. | .......... | 180/446 |
| 2009/0032327 A1* | 2/2009 | Yasuda | ........................ | 180/443 |
| 2009/0069979 A1* | 3/2009 | Yamashita et al. | ............ | 701/42 |
| 2009/0250289 A1* | 10/2009 | Kifuku | ........................ | 180/446 |

FOREIGN PATENT DOCUMENTS

| | | |
|---|---|---|
| JP | 6 127412 | 5/1994 |
| JP | 10 181617 | 7/1998 |

(Continued)

*Primary Examiner*—Lesley Morris
*Assistant Examiner*—Tashiana Adams
(74) *Attorney, Agent, or Firm*—Oblon, Spivak, McClelland, Maier & Neustadt, L.L.P.

(57) ABSTRACT

An electric power steering apparatus in which, when an abnormality is generated in an electric power steering apparatus, an assist is reduced smaller than normal when a steering burden is estimated to be small; and the assist can be increased to normal and the steering burden can be sufficiently reduced when the steering burden is estimated to be large. When an abnormality is detected, an assist command is set smaller than at a normal time when there is no abnormality in a first range where the steering burden estimated by the steering burden estimation unit is small; the assist command is increased to that at a normal time in a second range where the steering burden estimated by the steering burden estimation unit is larger than the first range; and an assist torque of a motor is controlled in response to the assist command at the abnormal time.

11 Claims, 11 Drawing Sheets

FOREIGN PATENT DOCUMENTS

| | | |
|---|---|---|
| JP | 2003 26020 | 1/2003 |
| JP | 2003 170857 | 6/2003 |
| JP | 2006-7860 | 1/2006 |
| JP | 2006-123827 | 5/2006 |
| JP | 2006 143106 | 6/2006 |

* cited by examiner

ELECTRIC POWER STEERING DEVICE

TECHNICAL FIELD

The present invention relates to an electric power steering apparatus which is mounted on an automobile or the like and, more particularly, relates to an improvement in a feeling of steering that a driver feels in the event of a failure of a part of an apparatus body.

BACKGROUND ART

Patent Document 1 shown as a known apparatus discloses one in which a current is made smaller than normal, that is, an assist is limited to be small to continue control at an abnormal time when a disconnection has occurred in one phase of a motor of an electric power steering apparatus. This reduces torque pulsation generated by an abnormality; and consequently, a feeling of physical disorder that a driver feels can be reduced. Furthermore, Patent Document 2 discloses one in which the size of an assist is limited to be smaller than normal to continue control and is not rapidly reduced, but is gradually limited to be small in a stepwise fashion by multiplying a constant not higher than 1 to a normal assist gain in the case where a slight abnormality is generated at a part of an electric power steering apparatus body. This makes possible to reduce a feeling of physical disorder that a driver feels because there is no rapid change.

Patent Document 1: Japanese Unexamined Patent Publication No. 10-181617

Patent Document 2: Japanese Unexamined Patent Publication No. 2003-170857

Patent Document 3: Japanese Examined Patent Publication No. 3600805

DISCLOSURE OF THE INVENTION

Problems to be Solved by the Invention

In Patent Documents 1 and 2, the assist is limited to be smaller than normal and a feeling of physical disorder due to torque pulsation generated by the abnormality can be reduced; however, after the abnormality is generated, the assist is always limited to be small. Thus, the assist is small even at a steering time when a large assist is required to provide comfortable running; and therefore, there is a problem in that a steering burden of a driver becomes large. Furthermore, there is a case where an achievable assist becomes smaller than a target assist depending on a steering condition due to the generated abnormality. In this case, the assist becomes smaller than the target assist; and therefore, there is a problem in that the steering burden of the driver becomes large in the case where a target value of the assist remains to be limited to be small. For example, in the case where one phase of a motor is short-circuited, a braking torque is generated by a current flowing through a short-circuited portion, and the braking torque becomes large when steered fast; and therefore, the assist becomes smaller than the target assist.

The present invention has been made in view of the problems of such the above mentioned known apparatus, and an object of the present invention is to provide an electric power steering apparatus in which, in the case where an abnormality is generated at a part of an electric power steering apparatus body, the size of an assist by a motor is determined in response to an estimated steering burden by estimating the steering burden of a driver; and accordingly, the assist is reduced smaller than normal and a feeling of physical disorder that the driver feels is reduced when it is estimated that the steering burden is small; and the assist can be increased equal to normal and the steering burden can be sufficiently reduced when it is estimated that the steering burden is large.

Means for Solving Problem

According to the present invention, there is provided an electric power steering apparatus which includes: a torque sensor which detects a steering torque applied to a steering shaft by a driver; a motor which applies an assist torque for assisting steering to the steering shaft; a vehicle speed sensor which detects a vehicle speed; an assist command calculation unit which calculates an assist command in response to the steering torque detected by the torque sensor and the vehicle speed detected by the vehicle speed sensor; a motor controlling device which controls the assist torque of the motor in response to the assist command calculated by the assist command calculation unit; an abnormality detection unit which detects an abnormality generated in an electric power steering apparatus body; an assist command switching unit which switches the assist command and an assist command at an abnormal time; and a steering burden estimation unit which estimates a steering burden of the driver on a basis of at least any one signal of a rotational angular velocity of the motor detected from the motor, the steering torque, and the vehicle speed. In the case where the abnormality detection unit detects the abnormality, the assist command switching unit switches the assist command to the assist command at an abnormal time, thereby continuing a control of the assist torque of said motor in response to the assist command at an abnormal time; the assist command at an abnormal time is set smaller than that at a normal time when there is no abnormality in a first range where the steering burden estimated by the steering burden estimation unit is small; the assist command at an abnormal time is increased equally to that at a normal time when there is no abnormality in a second range where the steering burden estimated by the steering burden estimation unit is larger than the first range; and the assist torque is increased or decreased in response to the steering burden.

Furthermore, according to the present invention, there is provided an electric power steering apparatus which includes: a torque sensor which detects a steering torque applied to a steering shaft by a driver; a motor which applies an assist torque for assisting steering to the steering shaft; a vehicle speed sensor which detects a vehicle speed; an assist command calculation unit which calculates an assist command in response to the steering torque detected by the torque sensor and the vehicle speed detected by the vehicle speed sensor; a motor controlling device which controls the assist torque of the motor in response to the assist command calculated by the assist command calculation unit; an abnormality detection unit which detects an abnormality generated in an electric power steering apparatus body; an assist command switching unit which switches the assist command and an assist command at an abnormal time and a steering burden estimation unit which estimates a steering burden of the driver on a basis of at least any one signal of a rotational angular velocity of the motor detected from the motor, the steering torque, and the vehicle speed. The electric power steering apparatus is provided with an assist map for an abnormal time which preliminarily stores data of an assist command at an abnormal time in which the assist command at an abnormal time is set smaller than that at a normal time when there is no abnormality in a first range where the steering burden estimated by the steering burden estimation unit is small, and the assist command at an abnormal time is increased equally to that at a normal time when there is no abnormality in a second range where the steering burden estimated by the steering burden estimation unit is larger than the first range. In the case where the abnormality detection unit detects the abnormality, the assist command switching unit switches the assist command to the assist command at an abnormal time, thereby controlling the assist torque of the motor on a basis of the assist command at an abnormal time; and the assist torque is decreased or increased in response to the steering burden.

Advantageous Effect of the Invention

According to an electric power steering apparatus of the present invention, even after an abnormality is generated, the size of an assist by a motor can be adjusted in response to the size of an estimated steering burden by estimating a steering burden of a driver. Therefore, in the case where an abnormality detection unit detects the abnormality, an assist command at an abnormal time is set smaller than that at a normal time when there is no abnormality in a first range where the steering burden estimated by a steering burden estimation unit is small; torque pulsation due to the abnormality is suppressed; and a feeling of physical disorder can be reduced. Then, the assist command at an abnormal time is increased equally to that at a normal time when there is no abnormality in a second range where the steering burden estimated by the steering burden estimation unit is larger than the first range; the steering burden can be sufficiently reduced; and a comfortable feeling of steering can be obtained even after the abnormality is generated.

The foregoing and other object, features, aspects, and advantages of the present invention will become more apparent from the following detailed description of the present invention when taken in conjunction with the accompanying drawings.

BEST MODE FOR CARRYING OUT THE INVENTION

Embodiment 1

Figure 1:
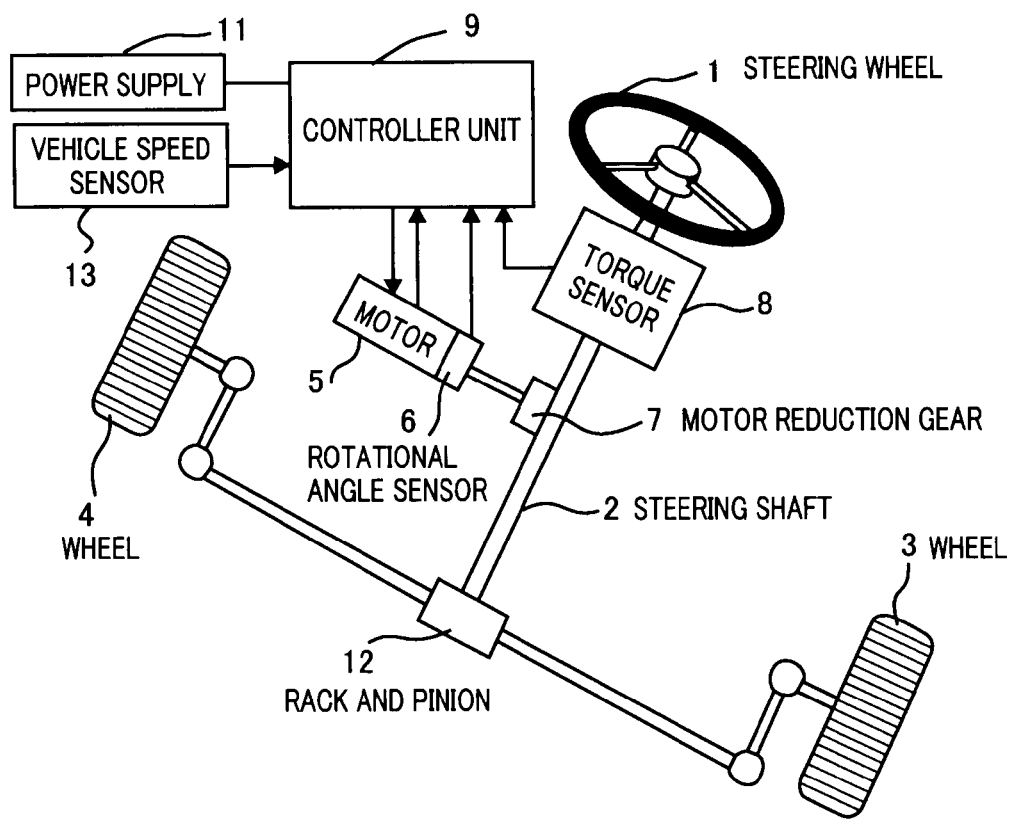
FIG. 1 is a schematic configuration diagram showing an electric power steering apparatus according to Embodiment 1 of the present invention.

FIG. 1 is a schematic configuration diagram of an electric power steering apparatus according to Embodiment 1 of the present invention. In the drawing, a steering torque applied to a steering wheel 1 by a driver is passed through a steering shaft 2 and is transmitted to a rack via a rack and pinion 12 to turn wheels 3 and 4. A motor 5 is coupled to a steering shaft 2 via a motor reduction gear 7. An assist torque (hereinafter, also referred to as motor torque) generated by the motor is transmitted to the steering shaft 2 via the motor reduction gear 7 to relieve the steering torque which is applied by the driver when steered.

A torque sensor 8 detects the steering torque applied to the steering shaft 2 by steering the steering wheel 1 by the driver. A controller unit 9 determines a direction and size of the assist torque applied by the motor 5 in response to the steering torque detected by the torque sensor 8 and a vehicle speed detected by a vehicle speed sensor 13, and controls a current flowing from a power supply 11 to the motor 5 so as to generate the assist force (assist torque). In addition, a rotational angle sensor 6 detects a rotational angle of the motor.

Figure 2:
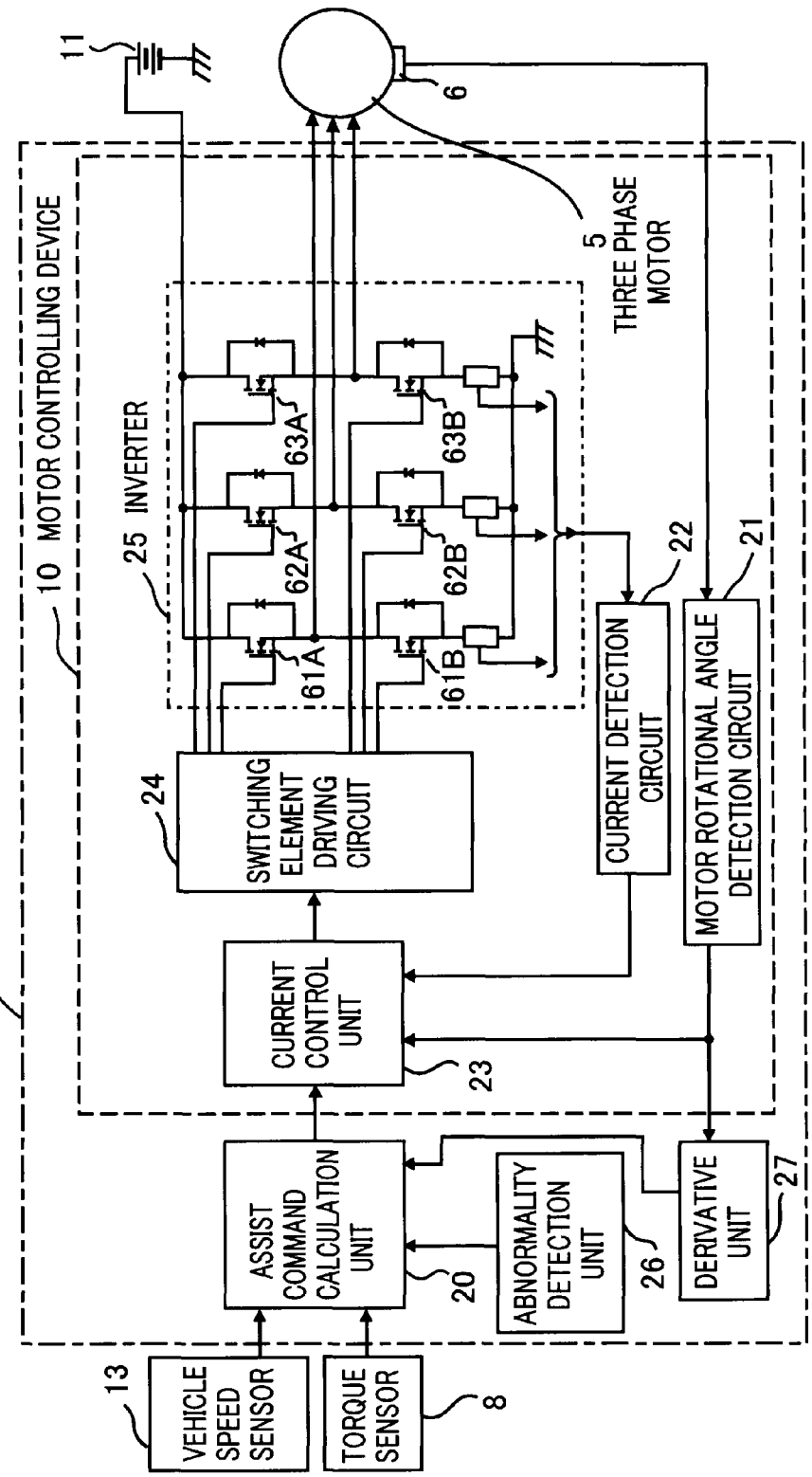
FIG. 2 is a block diagram showing a whole configuration of a controller unit according to Embodiment 1.

FIG. 2 is a block diagram showing a configuration of the controller unit 9 according to Embodiment 1. An assist command calculation unit 20 which calculates an assist command corresponding to a target value of the assist torque determines the direction and size of the motor torque corresponding to a steering torque signal detected by the torque sensor 8 and a vehicle speed signal detected by the vehicle speed sensor 13, and calculates the assist command. Furthermore, a motor rotational angle detection circuit 21 receives a signal outputted from the rotational angle sensor 6 which detects the rotational angle of the motor 5, and calculates the rotational angle of the motor 5. A derivative unit 27 approximately performs differential calculation of the rotational angle, and calculates a rotational angular velocity. In addition, a current detection circuit 22 detects a current to be flown to each phase of the motor.

A current control unit 23 calculates a voltage command in response to the assist command, the detection current of the motor, and the rotational angle. A switching element driving circuit 24 performs pulse width modulation (PWM) of the voltage command, and indicates switching operation to an inverter 25. The inverter 25 achieves a chopper control of switching elements 61A to 63A and 61B to 63B by receiving a switching operation signal, and provides a current to the motor by electric power which is supplied from a battery 11. The motor torque, that is, the assist torque is generated by the current. Furthermore, an abnormality detection unit, which detects an abnormality of an electric power steering apparatus body, is provided. In addition, a configuration of the inverter corresponds to a three phase motor; however, an H bridge circuit may be used in the case where the motor is a brush type DC motor.

Figure 3:
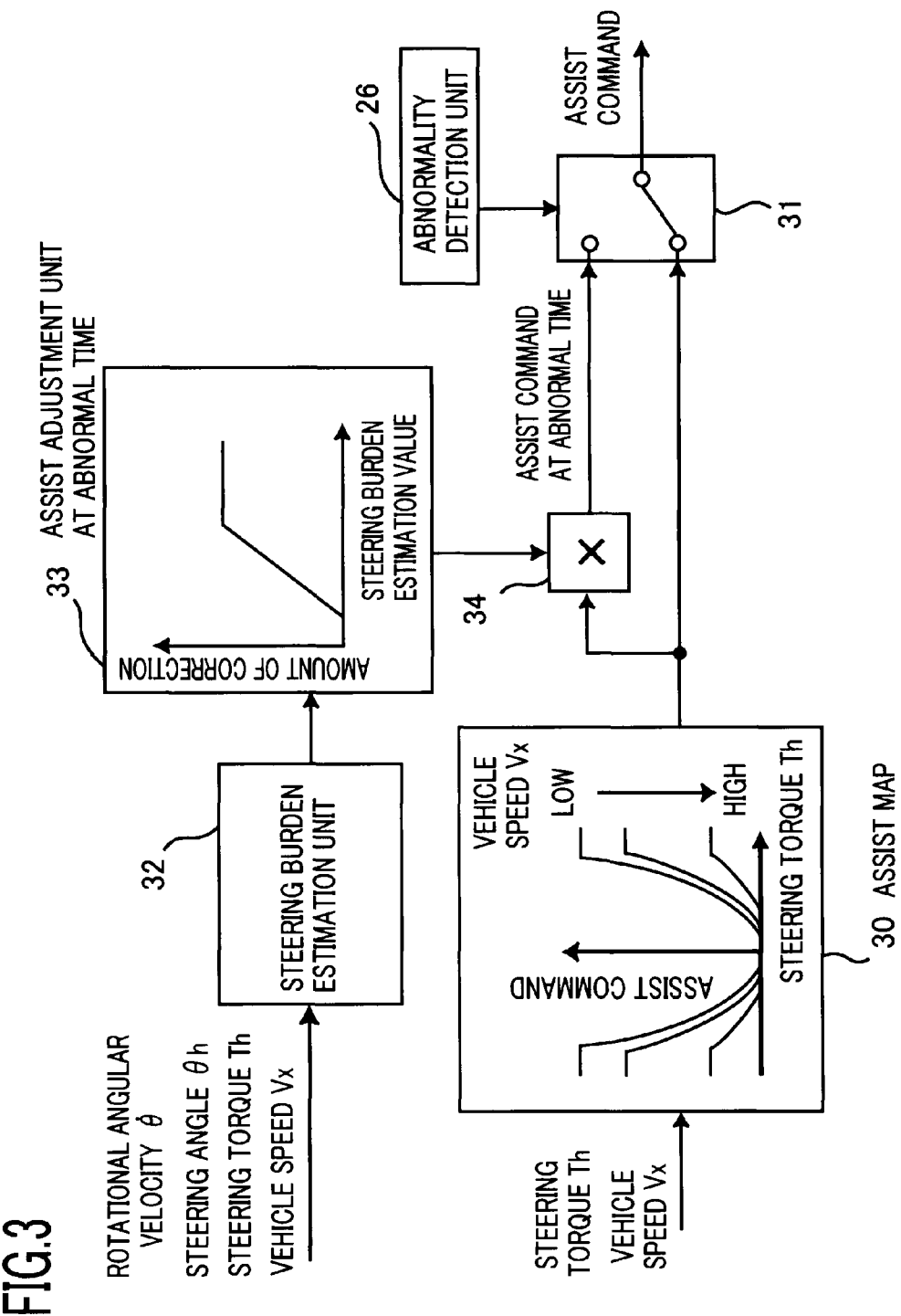
FIG. 3 is a block diagram showing an assist command calculation unit according to Embodiment 1.

FIG. 3 shows an assist command calculation unit of Embodiment 1. An assist map 30 preliminarily stores values of the assist command corresponding to a steering torque signal Th and a vehicle speed signal Vx and outputs the assist command. An assist command switching unit 31 switches a signal to be outputted in response to an abnormality detection signal in which an abnormality detection unit 26 outputs. In the case where the abnormality detection signal shows normal of the electric power steering apparatus body, the assist command switching unit outputs the assist command outputted by the assist map 30, and supplies to the current control unit 23 as a target motor torque, that is, a target current.

In the case where the abnormality detection signal of the abnormality detection unit 26 shows abnormality of the electric power steering apparatus body, a steering burden estimation unit 32 estimates a steering burden and outputs a steering burden estimation signal; and an assist command at an abnormal time calculated by an assist adjustment unit at an abnormal time 33 and a multiplication unit 34 serves as an output of the assist command switching unit 31 in response to the steering burden estimation signal, and is supplied to the current control unit 23 as the target current.

Figure 4A:
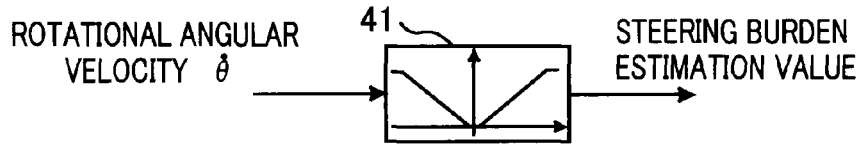
FIGS. 4A to 4C are block diagrams, each showing a configuration of a steering burden estimation unit according to Embodiment 1.
Figure 4B:
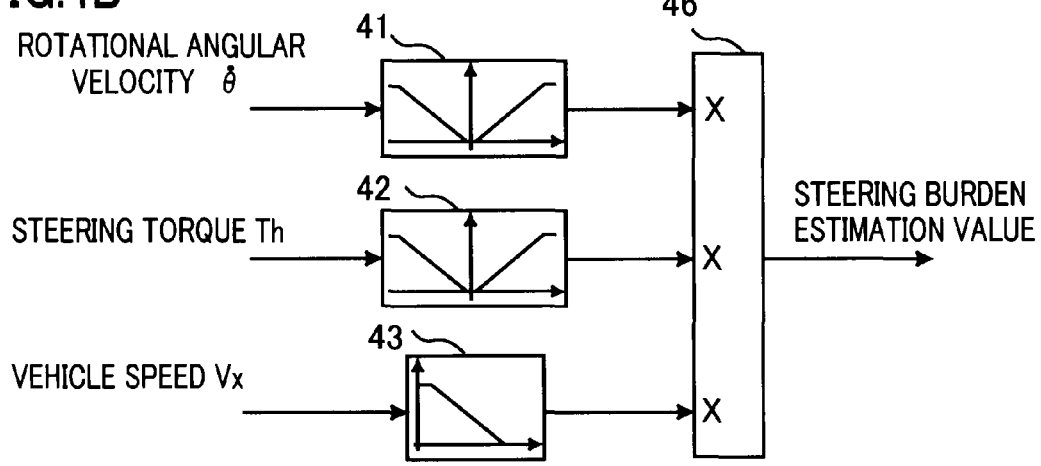
Figure 4C:
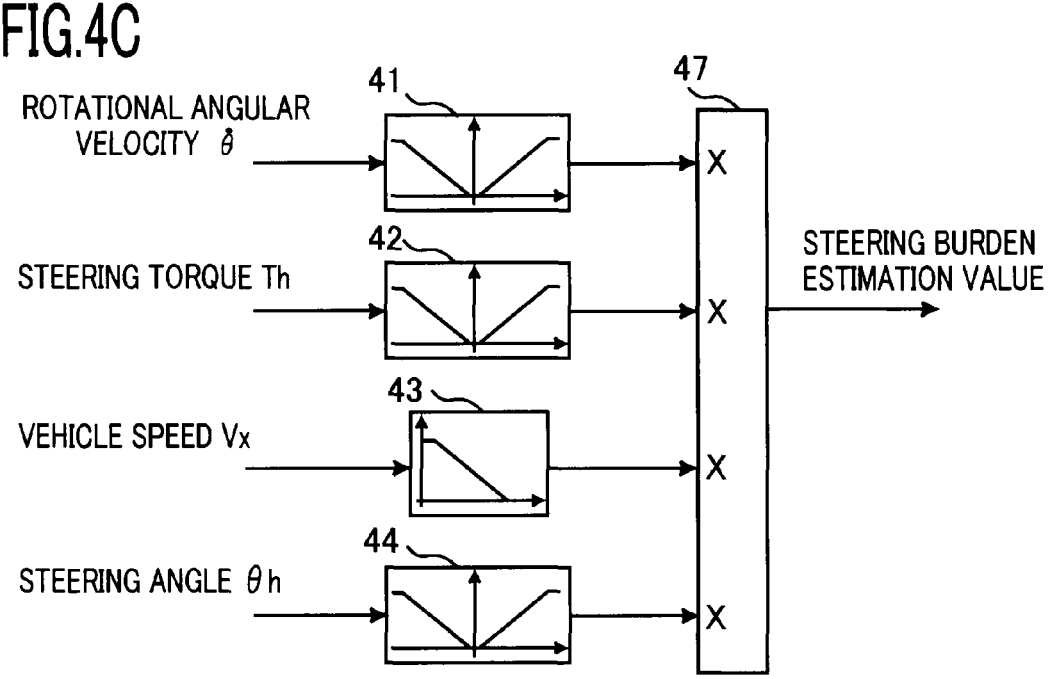

FIGS. 4A to 4C are block diagrams, each showing a configuration of the steering burden estimation unit of Embodiment 1. The steering burden estimation unit 32 is configured as shown in FIG. 4A, for example, in an estimation map 41, the steering burden estimation signal is outputted so as to be substantially proportional to the size of a rotational angular velocity dθ/dt. Alternatively, as shown in FIG. 4B, in estimation maps 41, 42, and 43, a signal substantially proportional to each size of the rotational angular velocity dθ/dt and the steering torque signal Th, and one in which a signal substantially inversely proportional to the vehicle speed signal Vx is multiplied or added may serve as the steering burden estimation signal. In FIG. 4B, multiplication is performed by a multiplication unit 46.

Furthermore, in the case where a sensor which detects a steering angle of a handle is added to the electric power steering apparatus, a detection signal of a steering angle θh may be used as shown in FIG. 4C. Reference numeral 44 denotes an estimation map, and 47 denotes a multiplication unit. In addition, the steering burden tends to substantially increase with an increase of the size of the rotational angular velocity dθ/dt, the steering torque Th, and the steering angle θh, and tends to decrease with an increase of the vehicle speed Vx.

As shown in FIG. 3, the assist adjustment unit at an abnormal time 33 is substantially proportional to the steering burden estimation signal, and outputs a signal which has a dead band in the vicinity of the original point and saturates in a region where the steering burden estimation signal is large. A signal in which the output signal and the assist command outputted by the assist map 30 are multiplied by the multiplication unit 34, serves as the assist command at an abnormal time. In addition, as the contents of the abnormality, there is an abnormality such as a disconnection occurred in one phase of motor wires. Patent Document 3 discloses that, in the case where such abnormality is generated, torque pulsation is generated; however, it is possible to continue an assist.

Figure 5:
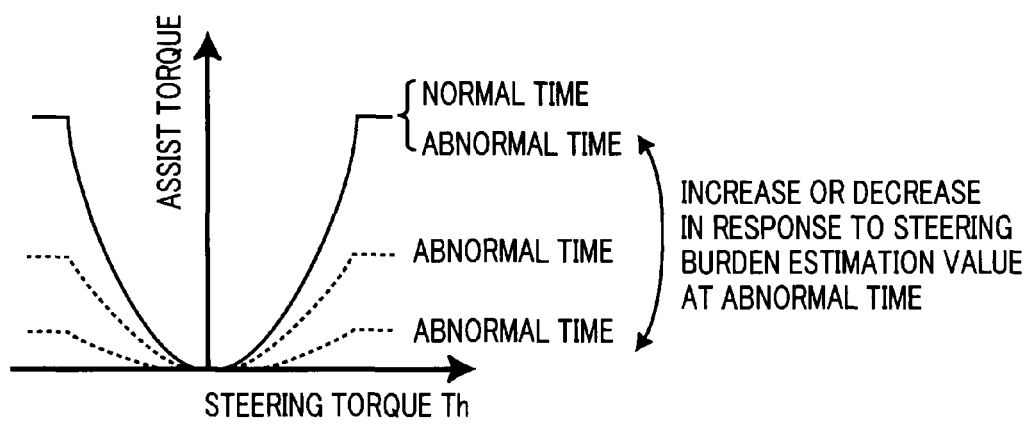
FIG. 5 is a view for explaining an assist torque according to Embodiment 1.

According to the configuration of Embodiment 1, in the case where an abnormality such as a disconnection occurred in one phase of motor wires is generated, the abnormality detection unit 26 outputs an abnormality detection signal showing that the abnormality is generated; this allows the steering burden estimation unit 32, the assist adjustment unit at an abnormal time 33, and the multiplication unit 34 to start calculation, to calculate an assist command at an abnormal time, and to control a current so as to achieve an assist torque corresponding to the assist command at an abnormal time. That is, in the case where it is estimated that a steering burden is small (a first range), torque pulsation is suppressed and a feeling of physical disorder that a driver feels can be reduced by reducing the assist torque smaller than that at a normal time when there is no abnormality. Furthermore, in the case where it is estimated that the steering burden is large (a second range larger than the first range), the steering burden of the driver can be sufficiently relieved by increasing the assist torque equally to that at the normal time when there is no abnormality (that is, by increasing to a size that is near or equal to that at the normal time when there is no abnormality). Therefore, as shown in FIG. 5, the assist torque at an abnormal time can obtain a size equal to that at the normal time, or a value of a range smaller than that at the normal time. As described above, in the first range where it is estimated that the steering burden is small, the assist command is limited to be small by strengthening a limitation of the assist command (that is, by reducing a gain); and, in the second range where it is estimated that the steering burden is large, the assist command is increased by loosening a limitation of the assist command than the first range (that is, by increasing the gain than the first range). This allows steering to be more comfortable even at an abnormal time.

Furthermore, an abnormality of a rotational angle sensor can also be included as the contents of the abnormality. Patent Document 3 discloses that, even when such abnormality is generated, the torque pulsation is generated; however, it is possible to continue an assist. Therefore, it is possible to control the assist by the configuration shown in Embodiment 1. However, in this case, since a signal of a rotational angular velocity cannot be used, a value based on the rotational angular velocity has to be zero in FIGS. 4A to 4C; but, the steering burden estimation signal can be calculated by other signal. In this case, the same effect as the before mentioned one can be obtained in accordance with other signals without using the rotational angular velocity signal.

In addition, as the contents of abnormalities of the apparatus body, a short-circuit between phases of motor wires, a short-circuit of motor windings, a ground short or a voltage short in one wire of motor wires, a short-circuit of a switching element, and the like can be included. In the event of such abnormalities, there is a case where a braking torque is generated by a current flowing through a short-circuited portion at an angle domain of a part of a motor rotational angle; however, it is possible to output a torque in an assist direction at other angle domain; and therefore, it is possible to continue the assist. In this regard, however, the braking torque has a property that becomes large in proportion to the rotational angular velocity of the motor; and therefore, if the assist torque is commanded as usual, the braking torque actually becomes large when the rotational angular velocity is large, and an assist which is more average than the command becomes deficient.

However, if the configuration as shown in Embodiment 1 is used, the assist command can be preliminarily increased by estimating that the steering burden becomes large in proportion to the rotational angular velocity; and therefore, it is possible to sufficiently relieve the steering burden of the driver. Furthermore, as in the before mentioned one, in the case where it is estimated that a steering burden is small, a feeling of physical disorder due to the torque pulsation can be reduced by reducing the assist torque. As described above, steering can be more comfortable even at an abnormal time by increasing or decreasing the size of the assist torque in response to the size of the steering burden to be estimated.

Embodiment 2

Figure 6:
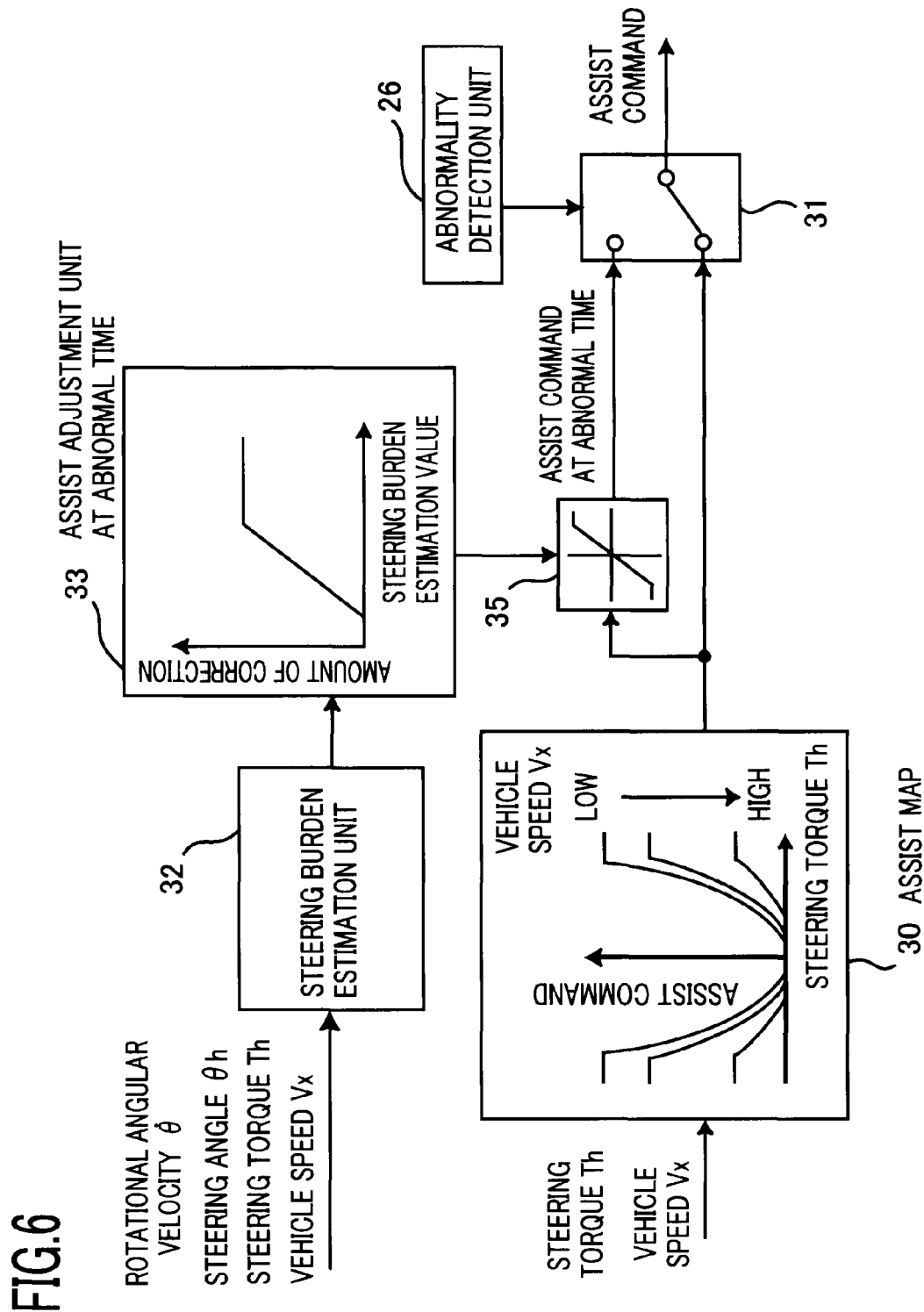
FIG. 6 is a block diagram showing an assist command calculation unit according to Embodiment 2.

FIG. 6 is a block diagram showing an assist command calculation unit 20 of Embodiment 2. The assist command calculation unit shown in FIG. 3 is used in Embodiment 1; however, it may be replaced with the unit shown in FIG. 6. In place of the multiplication unit 34 shown in FIG. 3, a saturation processing unit 35 is used in FIG. 6. An output signal of the assist adjustment unit at an abnormal time 33 serves as an upper limit value of a saturation process, and the saturation processing unit 35 performs a saturation process of an assist command outputted from an assist map 30 so as not to exceed the upper limit value. The saturation processed signal serves as an assist command at an abnormal time. According to the configuration as shown in Embodiment 2, the size of the assist command can be increased or decreased in response to a steering burden to be estimated; and consequently, the same effects as in Embodiment 1 can be obtained.

Embodiment 3

Figure 7:
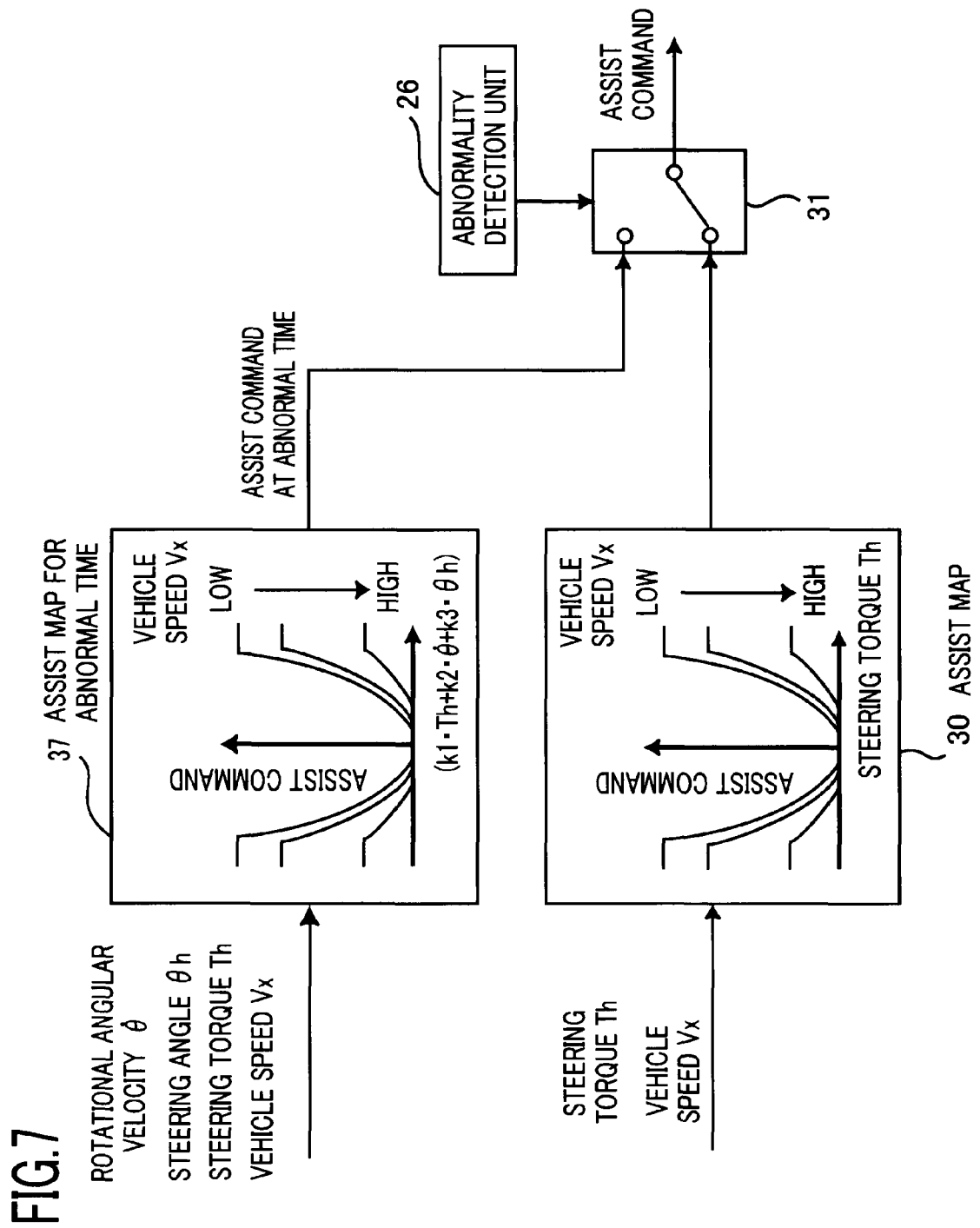
FIG. 7 is a block diagram showing an assist command calculation unit according to Embodiment 3.

FIG. 7 is a block diagram showing an assist command calculation unit 20 of Embodiment 3. The assist command calculation unit of FIG. 3 in Embodiment 1 and that of FIG. 6 in Embodiment 2 are used, respectively; however, they may be replaced with the unit shown in FIG. 7. An assist map for an abnormal time 37 shown in FIG. 7 is one in which values of the assist command at an abnormal time calculated by the steering burden estimation unit 32, the assist adjustment unit at an abnormal time 33, and the multiplication unit 34 shown in FIG. 3 are preliminarily stored as a map corresponding to the values of the rotational angular velocity $d\theta/dt$, the steering torque signal Th, the vehicle speed signal Vx, and the steering angle signal $\theta h$.

Alternatively, the assist map for an abnormal time 37 shown in FIG. 7 is one in which values of the assist command at an abnormal time calculated by the steering burden estimation unit 32, the assist adjustment unit at an abnormal time 33, and the saturation processing unit 35 shown in FIG. 6 are preliminarily stored as a map corresponding to the values of the rotational angular velocity $d\theta/dt$, the steering torque signal Th, the vehicle speed signal Vx, and the steering angle signal $\theta h$. Alternatively, the assist map for an abnormal time 37, as shown in a frame thereof 37, may be configured such that an assist signal at an abnormal time increases with an increase in size of linear sum ($k1 \cdot Th + k2 \cdot d\theta/dt + k3 \cdot \theta h$) with weight coefficients (k1, k2, and k3) for the steering torque signal Th, the rotational angular velocity $d\theta/dt$, and the steering angle signal $\theta h$; and the assist signal at an abnormal time decreases with an increase of the vehicle speed; and consequently, substantially the same map as the above two types can be obtained.

That is, it is possible that the assist map for an abnormal time 37 reduces the assist command at an abnormal time in the case where it is estimated that the steering burden is small, and increases the assist command at an abnormal time in the case where it is estimated that the steering burden is large. According to the configuration as shown in Embodiment 3, the same control as the configuration shown in Embodiment 1 or 2 can be performed, the size of the assist command can be increased or decreased; and therefore, the same effects as in Embodiment 1 or 2 can be obtained.

Embodiment 4

Figure 8:
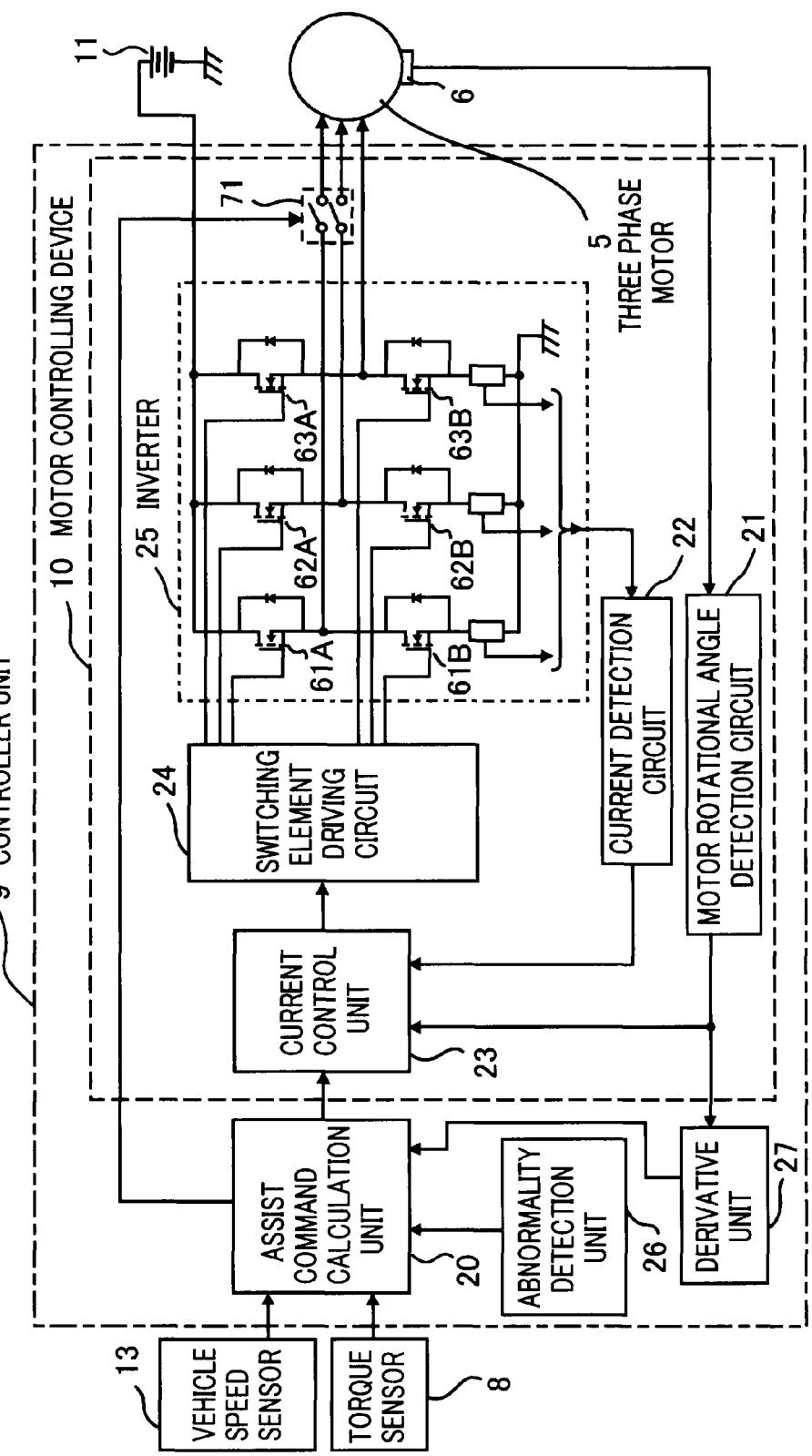
FIG. 8 is a block diagram showing a whole configuration of a controller unit according to Embodiment 4.

The electric power steering apparatuses shown in the above Embodiments are performed by increasing or decreasing the assist command when the assist is increased or decreased in response to the steering burden; however, in addition to this, a relay which cuts off a current is also used in Embodiment 4. In Embodiment 4, as shown in FIG. 8, a relay 71 is arranged on the wiring which connects between an inverter 25 and a motor 5; and in the case where a steering burden is sufficiently small and an assist is desired to be zero, the relay 71 is relived. That is, in the case where it is estimated that the steering burden is sufficiently small in a steering burden estimation unit 32 and an assist command at an abnormal time is zero, it is commanded by an assist command calculation unit 20 so as to release the relay 71. As a result, the relay 71 is released, the current to be flown to the motor 5 is cut off, and the assist can be zero. After that, in the case where the steering burden is increased again in the steering burden estimation unit 32, it is commanded so as to release the relay 71, and a motor torque is controlled in response to the assist command at an abnormal time.

In the configurations of Embodiments 1 to 3, even in the case where the assist command is zero, there is a case where a current is flown to the motor 5 and the motor torque is generated depending on a type of the abnormality such as the short-circuit of the switching element. However, according to the configuration of Embodiment 4, the current is cut off by the relay 71; and therefore, a torque can be zero even in such a case and a feeling of physical disorder that the driver feels can be reduced. In the above mention, a location of the relay 71 is arranged between the motor 5 and the inverter 25 as shown in FIG. 8; however, the current can be cut off even where the relay is arranged at a direct current portion of the inverter or at the inside of the motor, and the same effects can be obtained.

As described above, the relay which cuts off power feeding to the motor is provided and the relay is released so as to cut off the current in a third range where the steering burden estimated by the steering burden estimation unit is smaller than a first range (that is, the first range where it is estimated that the steering burden shown in Embodiment 1 is small).

As a result, even in the case where the assist command is zero, there is a case where a current is flown to the motor and a motor torque is generated by the influence of a back electromotive force or the like; however, according to the above mentioned configuration, the current is cut off by the relay; and therefore, the motor torque can be surely zero, and the feeling of physical disorder that the driver feels can be reduced.

Embodiment 5

In the electric power steering apparatuses shown in the above Embodiments, there are shown several systems which continue an assist in response to a steering burden in the case where an abnormality is generated in the apparatuses; however, in Embodiment 5, a unit which blocks a continued assist at an abnormal time on the basis of a certain termination condition is further provided. In Embodiment 5, as shown in FIG. 9, an assist termination unit at an abnormal time 72 is provided; and the assist termination unit at an abnormal time 72 decides whether or not the assist at an abnormal time is terminated by using at least any one of a vehicle speed, steering torque, steering angle, steering angular velocity, motor rotational angle, motor rotational angular velocity, longitudinal acceleration, lateral acceleration, yaw rate, and steering burden estimation value.

In the case where the assist termination unit at an abnormal time 72 decides that the assist at an abnormal time is terminated, the relay 71 is released (put OFF) to cut off a current, and the assist becomes zero. After that, the relay 71 is not closed (put ON) until an abnormal point is repaired.

Figure 9:
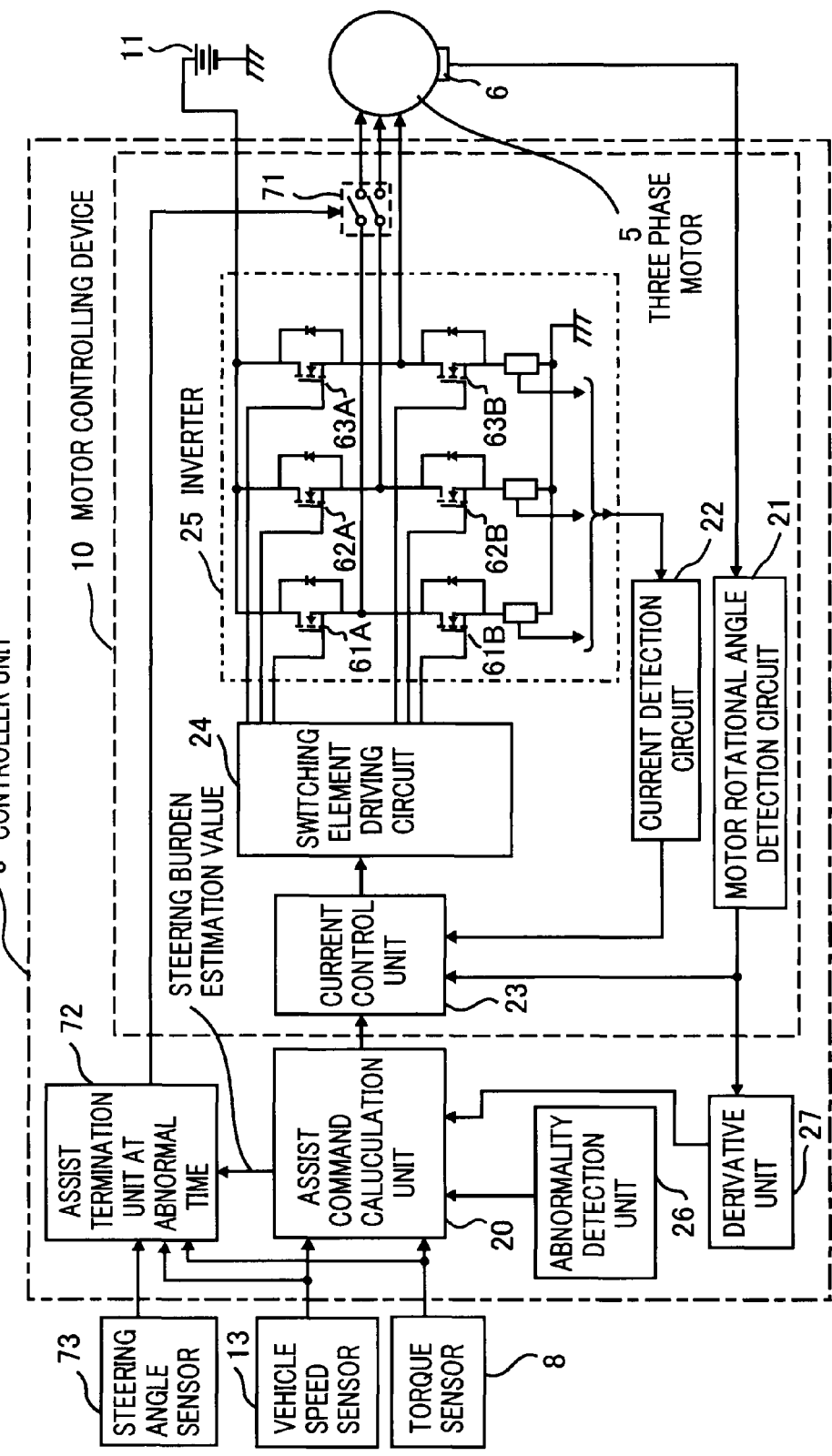
FIG. 9 is a block diagram showing a whole configuration of a controller unit according to Embodiment 5.

In addition, in FIG. 9, there are shown only the vehicle speed, steering torque, steering angle, and steering burden estimation value as signals for use in the assist termination unit at an abnormal time 72. However, in addition to such signals, a steering angular velocity in which a steering angle is differentiated, motor rotational angle, motor rotational angular velocity, longitudinal and lateral accelerations of a vehicle, vehicle yaw rate, and the like may be used.

Next, a process to be performed by the assist termination unit at an abnormal time 72 will be described. As for at least any one of the vehicle speed, steering torque, steering angle, steering angular velocity, motor rotational angle, motor rotational angular velocity, longitudinal acceleration, lateral acceleration, yaw rate, and steering burden estimation value; its value satisfies an assist termination decision condition at an abnormal time when a time smaller than each predetermined value continues for a predetermined time, the assist termination unit at an abnormal time 72 commands so as to terminate an assist at the abnormal time.

The decision condition means that, that is, each of the vehicle speed, steering torque, steering angle, steering angular velocity, motor rotational angle, motor rotational angular velocity, longitudinal acceleration, lateral acceleration, yaw rate, and steering burden estimation value of the above mentioned signals represents a magnitude of the amount of a movement condition of a vehicle; and therefore, it takes account that it is also small in influence on the movement condition of the vehicle even if the amount of a movement condition of the vehicle stops the assist by the electric power steering apparatus in the case where a time which is not more than the predetermined value continues for the predetermined time. Furthermore, in addition to such signals, a motor current may be used as a signal for use in the decision by the assist termination unit at an abnormal time 72, because the motor current is set so as to substantially proportionate on the basis of the amount of a condition such as the steering torque and the vehicle speed.

Figure 10:
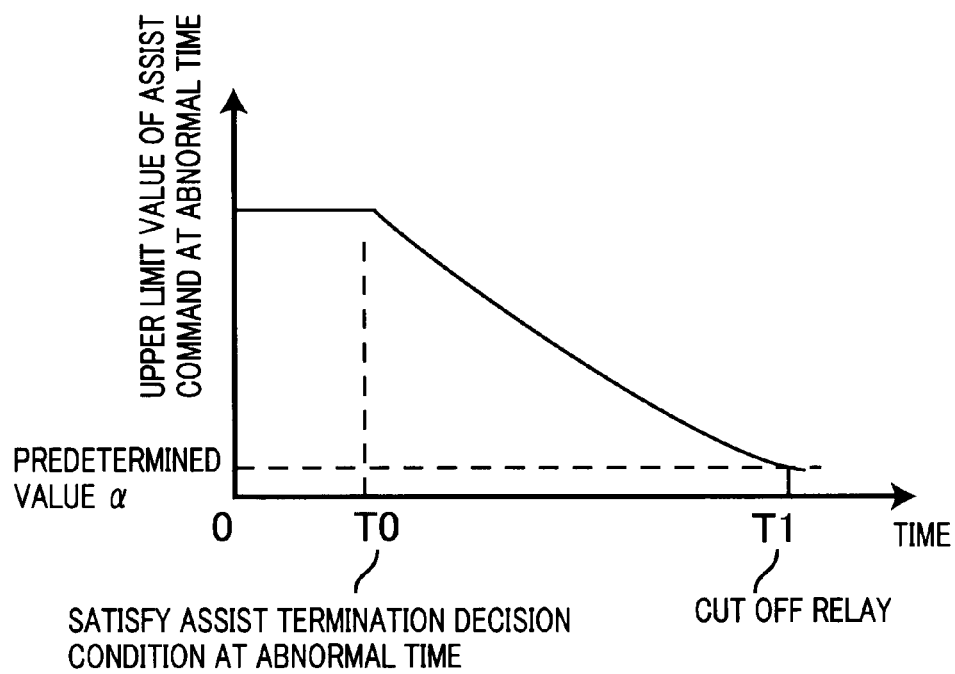
FIG. 10 is a view showing an upper limit value of an assist command at an abnormal time according to Embodiment 5.
Figure 11:
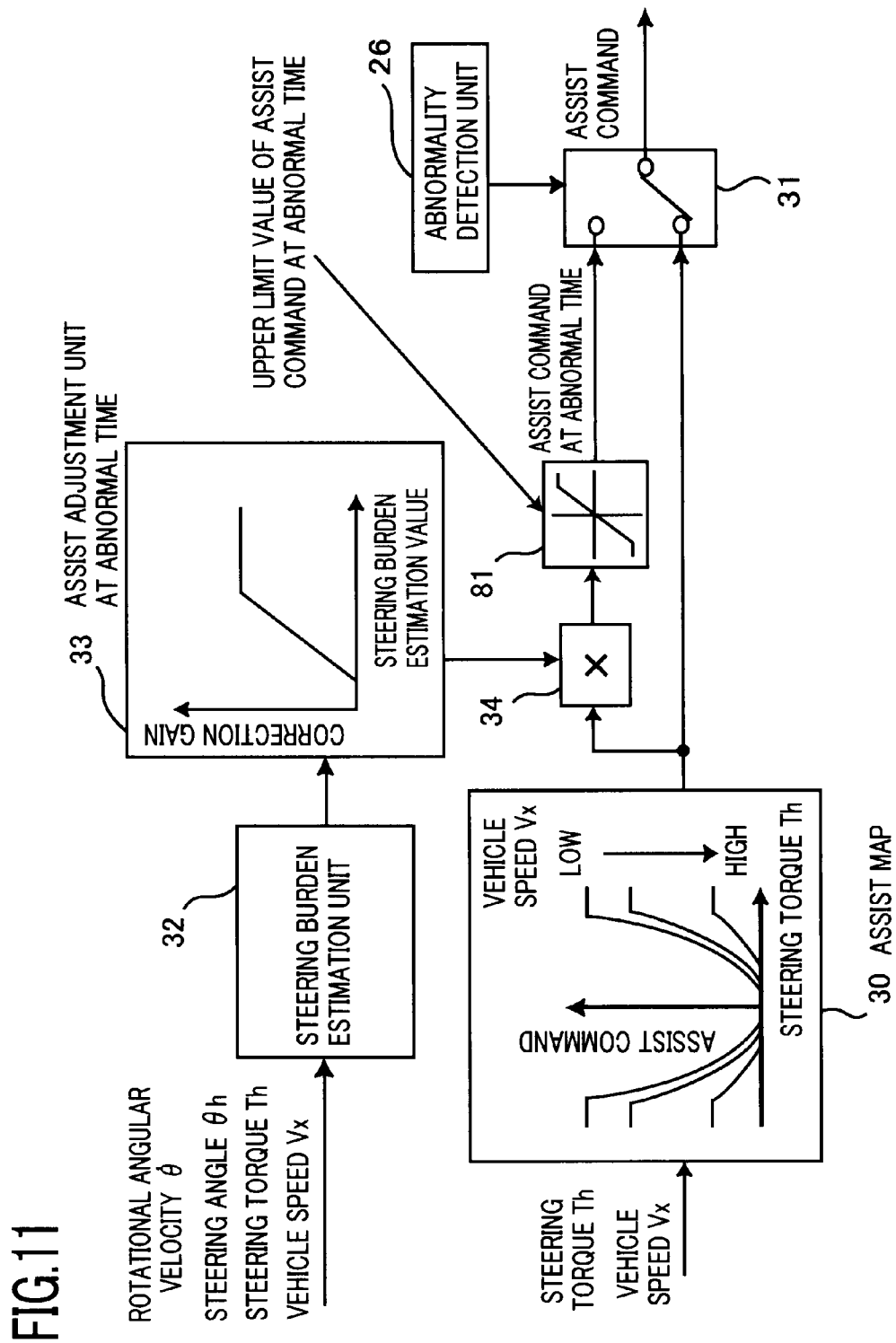
FIG. 11 is a block diagram showing an assist command calculation unit according to Embodiment 5.

Further, as shown in FIG. 10, the electric power steering apparatus in Embodiment 5 is provided with a unit in which, before the relay is released, an assist command at an abnormal time is gradually reduced after a time T0 when the assist termination decision condition at an abnormal time is saturated; and then, the relay is released. As shown in FIG. 11, the assist command calculation unit is provided with an assist limitation unit at an abnormal time 81, and a value limited by an upper limit value of the assist command at an abnormal time is outputted as the assist command at an abnormal time. As shown in FIG. 10, after the time T0 when the assist termination decision condition at an abnormal time is saturated, the upper limit value of the assist command at an abnormal time is gradually reduced, and at a time T1 when the upper limit value reaches not higher than a predetermined value α, the relay is released.

Furthermore, in addition to the above mention, the assist termination decision condition at an abnormal time is satisfied on the basis of merely a time, for example, when a predetermined time, for example, a time of 30 minutes is passed after an abnormality is detected by an abnormality detection unit 26; the upper limit value of the assist command at an abnormal time is gradually reduced after the saturated time T0; and the relay is released at the time T1 when the upper limit value reaches not higher than the predetermined value α. This is because it is estimated that if the time is sufficiently passed, a driver notices an abnormality, and a driving which suppresses a movement of a vehicle is performed. In FIG. 10, the assist command at an abnormal time is gradually reduced depending on a time. According to this method, the termination is made after the assist at an abnormal time is sufficiently reduced; and therefore, a feeling of physical disorder that the driver feels can be further reduced.

In addition, in FIG. 11, there is shown an example in which the assist limitation unit at an abnormal time 81 is provided with the assist command calculation unit shown in FIG. 3; however, the assist limitation unit at an abnormal time may be provided in the assist command calculation unit shown in FIGS. 6 and 7. According to the configuration shown in Embodiment 5, an assist torque which increases or decreases in response to a steering burden can be obtained by an assist command at an abnormal time based on a steering burden estimation unit 32, a feeling of physical disorder that a driver feels can be reduced, and an upper limit value of an assist torque is gradually reduced and a relay is released after a predetermined condition is satisfied; and therefore, the feeling of physical disorder that the driver feels can be reduced at a time when the assist at an abnormal time is terminated. In addition, also while the upper limit value is gradually reduced, a change in the assist command at an abnormal time is not neglected and the assist at an abnormal time can be terminated with an effect of control by the assist at an abnormal time being maintained; and therefore, the feeling of physical disorder that the driver feels can be reduced. Furthermore, it is possible to persuade the driver to repair an abnormal point without continuing the operation while a state where an abnormality is generated is left.

Various modifications and alternations of this invention will be apparent to those skilled in the art without departing from the scope and spirit of this invention, and it should be understood that this is not limited to the illustrative embodiments set forth herein.

The invention claimed is:

1. An electric power steering apparatus, comprising:
   a torque sensor which detects a steering torque applied to a steering shaft by a driver;
   a motor which applies an assist torque for assisting steering to said steering shaft;
   a vehicle speed sensor which detects a vehicle speed;
   an assist command calculation unit which calculates an assist command in response to the steering torque detected by said torque sensor and the vehicle speed detected by said vehicle speed sensor;
   a motor controlling device which controls the assist torque of said motor in response to the assist command calculated by said assist command calculation unit;
   an abnormality detection unit which detects an abnormality generated in an electric power steering apparatus body;
   an assist command switching unit which switches the assist command and an assist command at an abnormal time; and
   a steering burden estimation unit which estimates a steering burden of the driver on a basis of at least any one signal of a rotational angular velocity of said motor detected from said motor, the steering torque, and the vehicle speed,
   wherein, in a case said abnormality detection unit detects the abnormality, said assist command switching unit switches the assist command to the assist command at an abnormal time, thereby continuing a control of the assist torque of said motor in response to the assist command at abnormal time; the assist command at the abnormal time is set smaller than that at a normal time when there is no abnormality in a first range where the steering burden estimated by said steering burden estimation unit is small; the assist command at the abnormal time is increased equally to that at a normal time when there is no abnormality in a second range where the steering burden estimated by said steering burden estimation unit is larger than the first range; and the assist torque is increased or decreased in response to the steering burden.

2. The electric power steering apparatus according to claim 1, wherein a signal in which a value substantially proportionate to a steering burden estimation value estimated by said steering burden estimation unit is multiplied to a normal assist command in which said electric power steering apparatus body is not abnormal, serves as the assist command at an abnormal time.

3. The electric power steering apparatus according to claim 1, wherein a value substantially proportionate to a steering burden estimation value estimated by said steering burden estimation unit is set to an upper limit value, and a signal in which a saturation process is performed so that the assist command becomes not higher than the upper limit value, serves as an assist command at an abnormal time.

4. The electric power steering apparatus according to claim 1, wherein said steering burden estimation unit estimates the steering burden of the driver by a signal substantially proportionate to the size of at least either one signal of the rotational angular velocity and the steering torque, and by a signal substantially inversely proportional to the vehicle speed.

5. The electric power steering apparatus according to claim 1, wherein said steering burden estimation unit estimates the steering burden of the driver on a basis of at least any one signal of a steering angle detected by a steering angle sensor, the rotational angular velocity, the steering torque, and the vehicle speed.

6. The electric power steering apparatus according to claim 5, wherein said steering burden estimation unit estimates the steering burden of the driver by a signal substantially proportionate to the size of at least any one signal of the steering angle detected by the steering angle sensor, the rotational angular velocity and the steering torque, and by a signal substantially inversely proportional to the vehicle speed.

7. The electric power steering apparatus according to claim 1, further comprising:
   a relay which cuts off power feeding to said motor, the relay being released and cutting off a current in a third range where the steering burden estimated by said steering burden estimation unit is smaller than the first range.

8. The electric power steering apparatus according to claim 1, further comprising:
   a relay which cuts off power feeding to said motor; and
   an assist termination unit that terminates the assist command at the abnormal time, and
   wherein the assist command at the abnormal time releases said relay by said assist termination unit at the abnormal time and cuts off power feeding to said motor when an amount of a running condition of the vehicle becomes not higher than a predetermined value.

9. The electric power steering apparatus according to claim 1, further comprising:
   a relay which cuts off power feeding to said motor; and
   an assist termination unit that terminates the assist command at the abnormal time, and
   wherein the assist command at the abnormal time is set with an upper limit value; and
   the assist torque of said motor is controlled on a basis of the assist command at the abnormal time which is limited by the upper limit value,
   the upper limit value of the assist command at an abnormal time being reduced with a lapse of time, and
   said assist termination unit at the abnormal time releasing said relay and cutting off power feeding to said motor when the upper limit value reaches not higher than a predetermined value.

10. The electric power steering apparatus according to claim 9, wherein the upper limit value set in the assist command at the abnormal time is reduced with a lapse of time after an amount of a running condition of the vehicle becomes not higher than a predetermined value.

11. The electric power steering apparatus according to claim 9, wherein the upper limit value set in the assist command at the abnormal time is reduced with a lapse of time after a predetermined time.

* * * * *